(12) United States Patent
Gu et al.

(10) Patent No.: US 9,085,976 B2
(45) Date of Patent: Jul. 21, 2015

(54) METHOD AND APPARATUS FOR MODELING HIGH SOLIDS CONTENT FLUID FRACTURING

(75) Inventors: Hongren Gu, Sugar Land, TX (US); Yiyan Chen, Sugar Land, TX (US); Xiaowei Weng, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 750 days.

(21) Appl. No.: 13/327,965

(22) Filed: Dec. 16, 2011

(65) Prior Publication Data
US 2013/0158959 A1   Jun. 20, 2013

(51) Int. Cl.
G06G 7/48    (2006.01)
G06F 7/60    (2006.01)
E21B 43/26   (2006.01)

(52) U.S. Cl.
CPC ........... *E21B 43/26* (2013.01); *G01V 2210/646* (2013.01); *G01V 2210/66* (2013.01)

(58) Field of Classification Search
None
See application file for complete search history.

(56) References Cited

U.S. PATENT DOCUMENTS

| | | | |
|---|---|---|---|
| 5,518,996 A | 5/1996 | Maroy et al. | |
| 7,004,255 B2 * | 2/2006 | Boney | 166/280.2 |
| 7,528,096 B2 * | 5/2009 | Brannon et al. | 507/269 |
| 7,565,278 B2 * | 7/2009 | Li et al. | 703/10 |
| 7,644,761 B1 * | 1/2010 | Gu et al. | 166/280.1 |
| 7,784,541 B2 | 8/2010 | Hartman et al. | |
| 2005/0027499 A1 | 2/2005 | Bourbiaux et al. | |
| 2005/0172699 A1 | 8/2005 | Hu et al. | |
| 2008/0318026 A1 | 12/2008 | Dai et al. | |
| 2009/0025934 A1 * | 1/2009 | Hartman et al. | 166/280.2 |
| 2012/0000641 A1 | 1/2012 | Panga et al. | |
| 2012/0125617 A1 | 5/2012 | Gu et al. | |
| 2013/0220619 A1 | 8/2013 | Chen et al. | |

FOREIGN PATENT DOCUMENTS

| | | |
|---|---|---|
| WO | 9930249 | 6/1999 |
| WO | 2010117547 | 10/2010 |

OTHER PUBLICATIONS

"Procedures, Results, and Benefits of Detailed Fracture Treatment Analysis", Dobkins, Terry A. © Copyright 1981, Society of Petroleum Engineers of AIME.*
International Search Report and Written Opinion, Application No. PCT/US2012/067688 filed Dec. 4, 2012, dated Jan. 17, 2013.
Nolte, K.G.: "Application of Fracture Design Based on Pressure Analysis," SPE13393—SPE Production Engineering, vol. 3, No. 1, 31-42, Feb. 1988.

(Continued)

*Primary Examiner* — Omar Fernandez Rivas
*Assistant Examiner* — Nithya J Moll
(74) *Attorney, Agent, or Firm* — Mathieu Vandermolen; Rachel Greene; Tim Curington (57) ABSTRACT

An example apparatus includes a formation description module that interprets a formation description corresponding to a formation of interest, a fluid description module that interprets a high solids content fluid (HSCF) description, and a fracture modeling module that models a fracturing operation in the formation of interest in response to the formation description and the HSCF description. The apparatus further includes a fracture results module that provides a fracture treatment description parameter in response to the model.

8 Claims, 5 Drawing Sheets

(56) References Cited

OTHER PUBLICATIONS

Nolte, K.G. and Smith, M.B.: "Interpretation of Fracturing Pressures,"—SPE8297-JPT, vol. 12, No. 8, pp. 1767-1775, Sep. 1981.

Smith, M.B., Miller II, W.K., and Haga, J.: "Tip Screenout Fracturing: A Technique for Soft, Unstable Formations," SPE13273—SPE Production Engineering, vol. 2, No. 2, 95-103, May 1987.

Asgian, M.I., Cundall, P.A., and Brady, B.H. (1995) "Mechanical Stability of Porpped Hydraulic Fractures: A Numerical Study",—SPE28510—JPT, 203-208, Mar. 1995.

Milton-Tayler, D., Stephenson, C., and Asgian, M. (1992) "Factors Affecting the Stablility of Proppant in Propped Fractures: Results of a Laboratory Study," paper SPE 24821 presented at the SPE Annual Technical Conference and Exhibition, Washington, DC, Oct. 4-7.

Desroches, J., et al. (1993) On the Modeling of Near Tip Processes in Hydraulic Fractures. International journal of rock mechanics and mining sciences & geomechanics abstracts, 30(7): p. 1127-1134.

Desroches, J., et al. (1994) The Crack Tip Region in Hydraulic Fracturing. Proc. R. Soc. Lond. A, 447: p. 39-48.

* cited by examiner

METHOD AND APPARATUS FOR MODELING HIGH SOLIDS CONTENT FLUID FRACTURING

BACKGROUND

The technical field generally, but not exclusively, relates to modeling hydraulic fracture treatments utilizing high solids content fluids (HSCF). Among other differences, HSCF exhibit differential friction pressure, fracture propagation mechanisms, and equipment wear characteristics than more standard fracturing fluids. Accordingly, further technological developments are desirable in this area.

SUMMARY

One embodiment is a unique method for modeling a high solids content fluid fracture. Other embodiments include unique apparatuses and methods for modeling high solids content fluid fractures and for adjusting a fracturing treatment in response to the modeling. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the disclosure, reference will now be made to the embodiments illustrated in the drawings and specific language will be used to describe the same. It will nevertheless be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

The schematic flow descriptions which follow provide illustrative embodiments of performing procedures for modeling HSCF fracturing. Operations illustrated are understood to be examples, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An example procedure includes an operation to interpret a formation description corresponding to a formation of interest. Example and non-limiting information from the formation description includes a formation fracture gradient and/or fracture initiation pressure, a minimum in-situ stress, a maximum in-situ stress, formation permeability and/or other information that can be correlated to or utilized to determine fluid leakoff, the formation fluid pressure, formation temperature, a Young's modulus of the formation, and/or a Poisson's ratio of the formation. The formation description may be historical information determined from offset wells, information entered by a user, information determined from well logging, from fracture analysis or other tests, and/or best estimates based upon general knowledge about the formation geology, depth, etc. In certain embodiments, portions of the formation description are outputs of the model, and may be determined iteratively, by inference based on other parameters, or other methods understood in the art.

The example procedure further includes an operation to interpret an HSCF description. An HSCF description includes sufficient information about an HSCF fluid to enable the operations of the model. Example and non-limiting information includes a largest particle size, a packed volume fraction (PVF), a solid volume fraction/PVF (SVF/PVF) ratio, a fluid loss characteristic, a power-law fluid parameter, and/or a particle density parameter. An HSCF fluid is any fluid having a high solids content, either in an absolute sense or relative to other fluids ordinarily utilized in the context of the formation of interest.

Non-limiting example HSCF fluids include a fluid having particles such that a packed volume fraction (PVF) of the fluid exceeds 0.64, a fluid having a PVF exceeding 0.75, a fluid having a PVF exceeding 0.80, a fluid having a PVF exceeding 0.85, a fluid having a PVF exceeding 0.90, and/or a fluid having a PVF exceeding 0.95. HSCF fluids having high PVF values can be generated from a mixture of two or more particle types having distinct size distribution values, and/or from a group of particles having a heterogeneous size distribution over a wide enough size distribution. Certain additional or alternative example HSCF fluids include a fluid having at least two particle types having distinct size distribution values and/or a fluid having at least three particle types having distinct size distribution values. One or more of the particle types may be partially or completely degrading, dissolving, or reactive to formation fluids or introduced chemicals such that the particles disappear or flow back after the fracture treatment is completed.

Yet another example HSCF fluid includes a fluid having a high particle density or proppant density. A proppant density that is high is relative to the formation and application, and any proppant density that is higher than a normal proppant density for the area, formation permeability, or other parameters is contemplated herein. In certain embodiments, without limitation, proppant densities exceeding 6 PPA (pounds proppant added per gallon of carrier fluid), 8 PPA, 10 PPA, and 12 PPA are high proppant densities.

The use of an HSCF provides the treating fluid with certain characteristics. One or more of the described characteristics may be present in certain embodiments and not in others. Certain embodiments in accordance with the present disclosure may not include any of the described characteristics and nevertheless are contemplated herein. An example characteristic is that an HSCF provides a relatively high propped fracture volume relative to the hydraulically generated fracture volume, allowing the fracture to have a relatively high conductivity with low fluid leakoff and damage into the formation. Another example characteristic is that an HSCF experiences, in certain formulations, a relatively low particle settling rate, providing for simplified pumping execution in certain operations, for example when alternating between pumping one fluid through tubing and another fluid in a tubing-wellbore annulus. Another example characteristic is that the fluidizing and de-fluidizing nature of an HSCF provides for pressure oscillations during a fracture treatment. Pressure oscillations can be utilized to allow a fracture treatment to overcome stress differences of similar magnitude such as those experienced in a horizontal or highly deviated wellbore, and/or to overcome stress differences between a minimum in-situ horizontal stress and a maximum in-situ horizontal stress, enabling the generation of complex fractures. Another example characteristic is that, within a fracture, an HSCF can bridge and de-bridge, allowing for pumping operations to be controlled within a treating pressure range (or downhole pressure, specified position pressure, etc.) without the fluid in the fracture experiencing a permanent screenout.

The PVF of a fluid is the volume fraction of the dry fluid that is occupied by particles. For example, a fluid having particles that are uniformly sized spheres has a PVF of about 0.64. The SVF of a fluid is the portion of the fully formed fluid, with carrier liquid added, that is occupied by particles (solids). For example, where just enough liquid is included in the fluid to fill the pore spaces in the particles, the value of the SVF would be equal to the value of the PVF, or the SVF/PVF ratio would be one (1).

Figure 8:
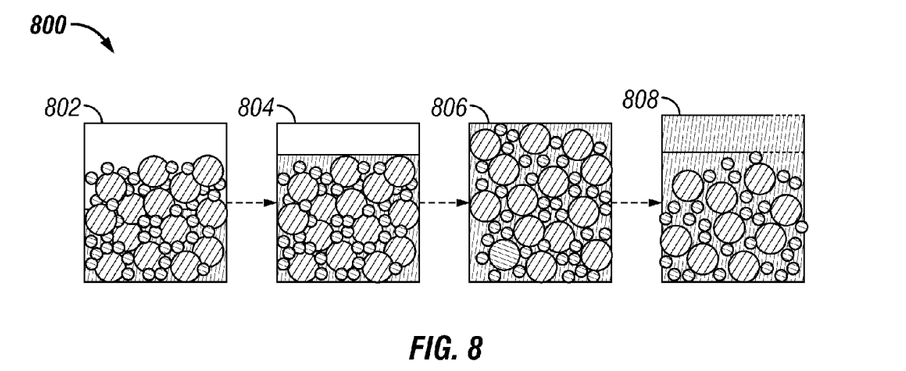
FIG. 8 is a schematic illustration of a number of HSCF stability regimes.

Referencing FIG. 8, a system 800 showing a particle mix with added carrier liquid is illustrated. The first fluid 802 does not have enough liquid added to fill the pore spaces of the particles, or the SVF/PVF is greater than one (1). The first fluid 802 is not mixable. The second fluid 804 has just enough liquid to fill the pore spaces of the particles, or the SVF/PVF is equal to one (1). Testing determines whether the second fluid 804 is mixable and/or pumpable, but a fluid with an SVF/PVF of one (1) is generally not mixable. The third fluid 806 has more liquid than is required to fill the pore spaces of the particles, or the SVF/PVF is less than one (1). A range of SVF/PVF values less than one (1) will generally be pumpable and mixable, and the third fluid 806 is stable. The values of the range of SVF/PVF values that are pumpable, mixable, and/or stable are dependent upon, without limitation, the specific particle mixture, carrier fluid viscosity, the PVF of the particles, and the density of the particles. Simple laboratory testing of the sort ordinarily performed for fluids before fracturing treatments can readily determine the stability of a particular fluid for a particular fracturing treatment.

The fourth fluid 808 has more liquid than the third fluid 806, to the point where the fourth fluid 808 is mixable but settles and has free liquid at the top (or bottom, depending upon the densities of the components of the fourth fluid 808). The amount of free liquid and the settling time over which the free liquid develops before the fluid is considered unstable are parameters that depend upon the specific circumstances of a treatment. For example, if the settling time over which the free liquid develops is greater than a planned treatment time, then in one example the fluid would be considered stable. Other factors, without limitation, that may affect whether a particular fluid is stable include the amount of time and flow regimes (e.g. laminar, turbulent, Reynolds number ranges, etc.) of the fluid flowing in the wellbore, the amount of time and flow regimes of the fluid flowing in the fracture, and/or the amount of fluid leakoff occurring in the fracture. A fluid that is stable for one fracturing treatment may be unstable for a second fracturing treatment. The determination that a fluid is stable may be an iterative determination based upon initial estimates and subsequent modeling results.

Figure 7:
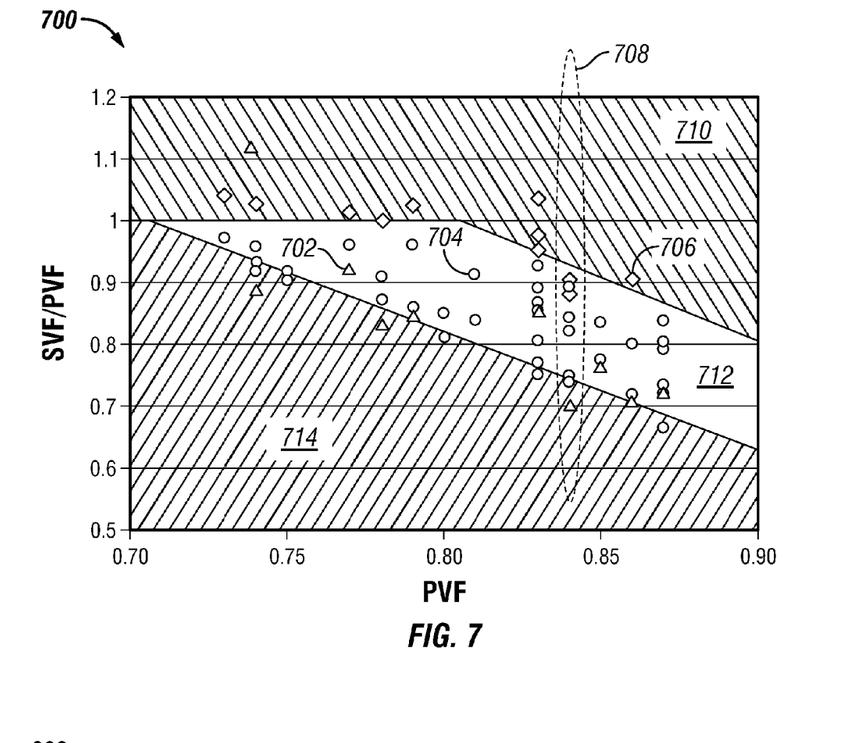
FIG. 7 illustrates a number of fluid stability regions for an HSCF.

Referencing FIG. 7, a data set 700 of various fluids is illustrated. Data points 702 indicated with a triangle were values that had free water in the slurry, data points 704 indicated with a circle were slurriable fluids that were mixable without excessive free water, and data points 706 indicated with a diamond were not mixable fluids. The data set 700 includes fluids prepared having a number of discrete PVF values, with liquid added until the fluid transitions from not mixable to a slurriable fluid, and then further progresses to a fluid having excess settling. At an example PVF value 708, near PVF=0.83, it is observed that around an SVF/PVF value of 0.95 the fluid transitions from an unmixable fluid to a slurriable fluid. At around an SVF/PVF of 0.7, the fluid transitions to an unstable fluid having excessive settling. It can be seen from the data set 700 that the fluid can be defined approximately into a non-mixable region 710, a slurriable region 712, and a settling region 714.

The division of the data set 700 into regions 710, 712, 714 can assist in developing a rapid design scheme for working with a particular fluid. Generally, a fluid having a higher PVF is more robust to settling, remaining stable at lower SVF/PVF ratios, but is more difficult to mix, requiring lower SVF/PVF ratios before becoming mixable. However, the regions 710, 712, 714 are examples and non-limiting. For example, a particular treatment may be more or less stringent on the settling criteria which changes the boundary between the slurriable region 712 and the settling region 714 without changing the composition of the fluid. Further, changes in the fluid makeup, including carrier fluid viscosity, size ranges of particles making up the fluid, etc. may change the positions of the regions 710, 712, 714. The type of data in the data set 700 can be readily determined for a particular fluid. It is a mechanical step for one of skill in the art, having the benefit of the disclosures herein, to determine the stability profile for a particular fluid.

An example procedure includes the HSCF description having information for more than one HSCF. A number of HSCF treating fluids may be provided as alternatives to be tested in the model, and/or as fluids to be utilized at differing times during a treatment.

The example procedure further includes an operation to model a fracturing operation in the formation of interest in response to the formation description and the HSCF description. An example modeling operation includes modeling HSCF bridging and debridging events, and determining pressure oscillations in response to the HSCF bridging and debridging events.

Figure 4:
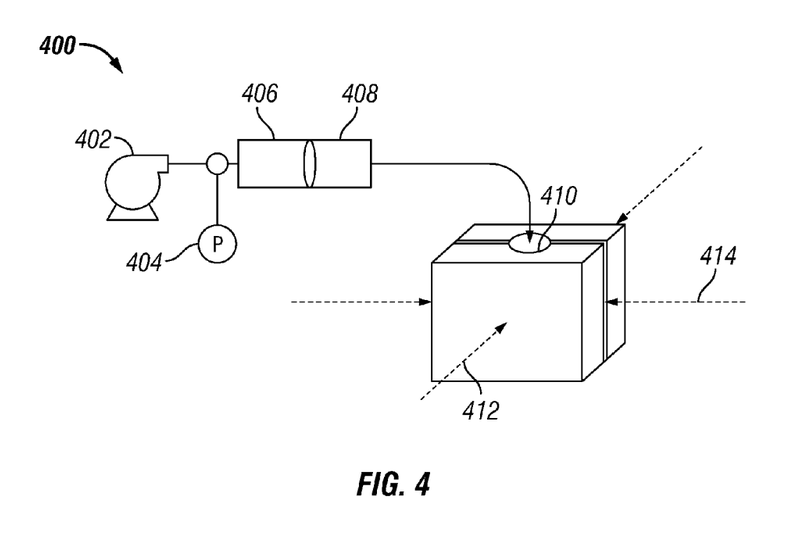
FIG. 4 is a schematic illustration of a laboratory setup for testing an HSCF.
Figure 5:
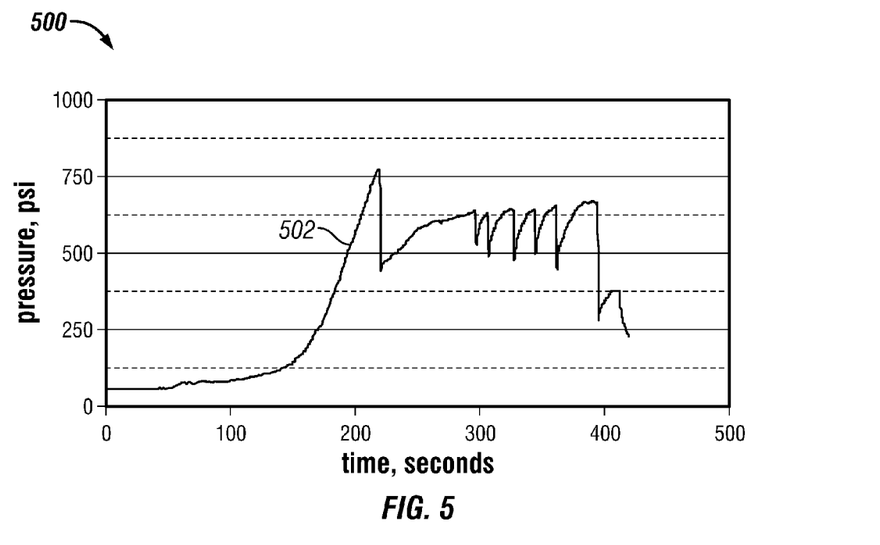
FIG. 5 depicts laboratory test data for an HSCF.

Referencing FIG. 4, a schematic of a laboratory experimental setup 400 is depicted. The setup 400 includes a pump 402, a pressure gauge 404, a hydraulic fluid 406 pressurized by the pump, and an HSCF 408 which is thereby pumped by the hydraulic fluid 406. A piston between the hydraulic fluid 406 and the HSCF 408 communicates pressure between the hydraulic fluid 406 and the HSCF 408. An experimental formation sample has a minimum horizontal stress 412 and a maximum horizontal stress 414 applied. The fracture forms perpendicular to the minimum horizontal stress 412. The formation sample has a "wellbore" 410 where the HSCF 408 is injected. A laboratory setup 400 similar to FIG. 4 was constructed, and the resulting pressure data from the pumping is plotted in the data 500 of FIG. 5. The pressure curve 502 exhibits a peak breakdown pressure around time 210 seconds, and after some period the pressure begins to exhibit pronounced oscillation (after about 300 sec. until shutdown).

Figure 6:
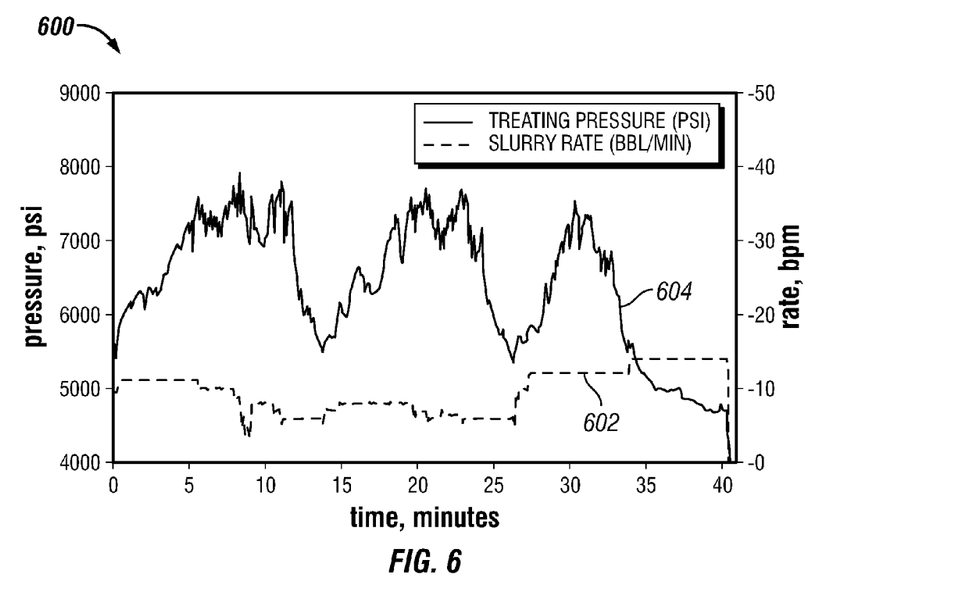
FIG. 6 depicts fracture treatment data for an HSCF.

Referencing FIG. 6, field data 600 is depicted. The field data 600 is from a formation treated at fracturing injection rates with an HSCF. The pumping rate curve 602 indicates the fluid slurry rate over time, and the treating pressure curve 604 indicates the treating pressure over time. The field data 600 exhibits pressure oscillations of varying amplitudes.

In certain further embodiments, the modeling HSCF bridging and debridging events includes estimating a first fracture width to cause bridging in the HSCF and a second fracture width to cause debridging in the HSCF. For example, a width profile axially along the fracture is estimated, and a position within the fracture where the width drops below a first fracture width is estimated to bridge, and any position along the fracture where the width exceeds the second fracture width is estimated to debridge. An example first fracture width value includes a width less than 2.5 times a largest particle size of the HSCF. An example second fracture width value includes a width greater than 5.5 times the largest particle size of the HSCF.

Referencing FIGS. 2A, 2B, 2C, and 2D, the bridging and debridging behavior of an HSCF is illustrated conceptually. The fracture tips 202A, 202B, 202C, 202D are conceptual illustrations of a fracture tip as sequential time steps, although no particular time relationship other than sequential is indicated. At the first fracture tip 202A, the fracture width has decreased to the point where the fluid has formed a bridged boundary 204A, stopping the propagation of the fracture past the bridge 204A. In one example, the first fracture tip 202A occurs when the fracture width at the tip is lower than the first fracture width. As the treatment continues, the pressure in the fracture increases and the fracture width increases at the tip, until at the second fracture tip 202B the bridge 204B begins to destabilize. In one example, the second fracture tip 202B occurs when the fracture width at the tip is greater than the second fracture width. At the time of the third fracture tip 202C, fresh fluid that is not depleted of carrier fluid begins to push through the previously bridged portion 204C, allowing further fracture propagation and reducing the pressure in the fracture. At the time of the fourth fracture tip 202D, the fluid again begins to bridge 206 at the tip, and pressure in the fracture builds again. In one example, the bridge 206 occurs when the fracture width is reduced below the first fracture width.

The description referencing FIG. 2 is an illustrative concept. No particular mechanism is intended to be limiting to the disclosure herein. The modeling described herein may be matched to an HSCF fracturing operation regardless of the specific mechanism of the HSCF operating in the fracture. In certain embodiments, and without limitation, the HSCF may deplete of carrier fluid, thereby de-fluidizing and causing bridging, re-absorb fluid from incoming fresh fluid and re-fluidize causing debridging, the HSCF may self-divert, cause fractures to bypass a bridged fracture tip, cause complex fracturing (e.g. fractures not just perpendicular to the minimum in-situ stress), and/or cause multiple fractures to develop from the same group of perforations.

Figure 3:
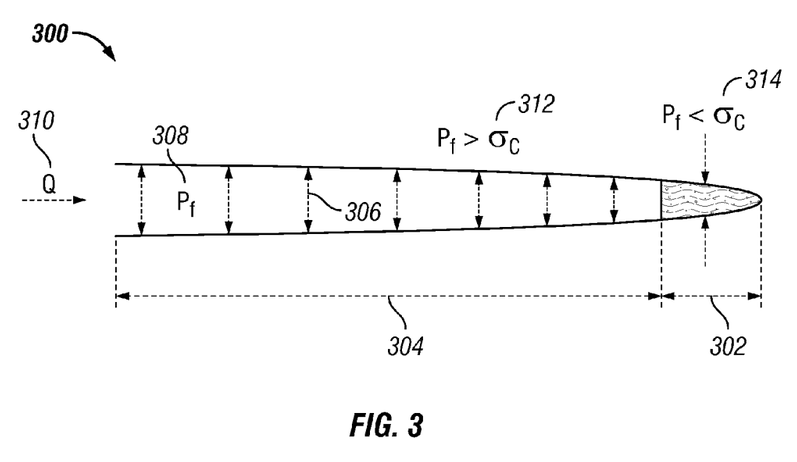
FIG. 3 is a conceptual illustration of an HSCF propped fracture having a packed portion and an unpacked portion.

Referencing FIG. 3, an example procedure includes an operation to model HSCF bridging and debridging events by tracking a packed fracture portion 302. The depicted fracture 300 includes the packed fracture portion 302 and an unpacked fracture portion 304. Growth of the fracture 300 is inhibited past the packed portion 302. Fluid flow 310 into the fracture 300 supports the fracture pressure 308, which in the unpacked portion is greater than the minimum in-situ stress as illustrated at pressure indication 312. At the packed portion, the fluid pressure in the fracture is equal to or less than the minimum in-situ stress as illustrated at pressure indication 314. The fracture width 306 is determined along the length of the fracture 300, allowing an estimate of where the fracture bridges, debridges, and how far the fracture can propagate until rebridging occurs.

The example procedure further includes tracking the packed fracture portion 302, a fluid loss through the packed fracture portion 302, and a fracture width 306 at the packed fracture portion 302. In certain further embodiments, the operation to track the packed fracture portion includes modeling a fluid loss of the HSCF in the fracture 300, determining an SVF/PVF value for the HSCF in the fracture 300, and tracking the packed fracture portion 302 in response to the SVF/PVF value.

The example procedure includes an operation to discretize the fracture pressure 308 and width 306 values, as well as other fracture modeling values including the fluid composition in the fracture, temperatures and chemical reactions within the fluid and particles in the fracture, the leakoff of fluid from the fracture into the surrounding formation, the temperature of the surrounding formation, and any other values or parameters that are tracked by the model. Additionally or alternatively, the discretization of the fracture modeling values may be 2-dimensional (e.g. axially and vertically) and/or 3-dimensional (e.g. in the direction of the fracture width, or azimuthally relative to the wellbore). The selection of discretization dimensionality, coordinate selection (e.g. Cartesian, polar/cylindrical, spherical), size of time steps for numerical simulation, geometric size of discretized modeling elements/nodes, etc. are mechanical steps for one of skill in the art having the benefit of the disclosures herein. In certain embodiments, the discretization criteria are varied between modeled parameters—such as modeling the fracture width with a high geometric resolution, small time-step numeric simulation while modeling the formation temperature with a low geometric resolution, large time-step numeric simulation. Without limitation, the desired precision, available computing resources and computational time available, and/or the available precision and resolution of any modeling input data and/or modeling verification data are considerations to selecting the overall discretization scheme. Accordingly, a wide range of discretization criteria are contemplated herein.

An example procedure further includes an operation to provide a fracture treatment description parameter in response to the modeling. Non-limiting examples of a fracture treatment description parameter include a maximum treating pressure, a maximum and/or a minimum treating injection rate, a treating pressure trajectory, a treating injection rate trajectory, a limiting operating parameter description, an operating parameter recommendation, a propped fracture length, a propped fracture height, a propped fracture conductivity, an estimated stimulation volume (ESV), and/or a reservoir stimulation volume (RSV). Both ESV and RSV are used in the art to describe effectiveness of a stimulation in a pay zone, and are sometimes used interchangeably. Any parameter provided by the model or derivable from a model output that describes a property of the placed fracture(s) and/or that describes conditions relevant to the placement of the fracture(s) is contemplated as a fracture treatment description parameter.

An example model includes a width profile equation, such as:

$$w(x) = \frac{4}{\pi E'} \int_0^L \ln\left[\frac{\sqrt{L^2-x^2}+\sqrt{L^2-\xi^2}}{\sqrt{L^2-x^2}-\sqrt{L^2-\xi^2}}\right][p(\xi)-\sigma_{min}]d\xi \quad \text{Eq. 1}$$

a fluid flow equation, such as:

$$\frac{\partial w}{\partial t} + \frac{\partial q}{\partial x} + q_L = 0 \quad \text{Eq. 2}$$

a fluid leakoff equation, such as:

$$q_L = \frac{2C_L}{\sqrt{t-\tau(x)}} \quad \text{Eq. 3}$$

and a flow rate equation such as:

$$q = -\frac{n}{n+1}\left(\frac{1}{2^{n+1}k}\right)^{\frac{1}{n}}\left(\frac{\partial p}{\partial x}\right)^{\frac{1}{n}} w^{\frac{2n+1}{n}} \quad \text{Eq. 4}$$

In the example equations, w(x) is the fracture width at axial position x, E' is the plane strain Young's modulus $$E' = \frac{E}{1-v^2},$$

where E is the Young's modulus of the formation of interest and v is the Poisson's ratio of the formation of interest, L is the axial extent of the fracture, where $\sigma_{min}$ is the minimum in-situ horizontal stress, where $\xi$ is a distance related integration variable from 0 (e.g. at the wellbore) to L. The first equation provides a width profile axially along the fracture, and is utilized in one example to provide fracture width values 306 that provide HSCF bridging and debridging estimates.

In the example equations, the fluid leakoff Eq. 3 provides the fluid leakoff flow rate. $C_L$ is a fluid leakoff coefficient, where t is injection time, where $\tau$ is a leakoff time at fracture axial position x. From Eq. 4, n and k are power-law fluid effective viscosity parameters. Equations 1-4 are readily extensible to 2-dimensional and/or 3-dimensional modeling as desired, and may be discretized as described preceding.

In certain embodiments, example boundary conditions include a first boundary condition:

$$q(0,t)=q_i(t) \quad \text{Eq. 5}$$

and a second boundary condition:

$$p(L,t)=p_0 \text{ at } x=L \quad \text{Eq. 6}$$

The first boundary condition indicated in Eq. 5 provides that the flow rate at the fracture entrance is equal to the injection rate of the treatment fluid. It is understood that the first boundary condition assumes an incompressible fluid in the wellbore and treating lines. Where a compressible fluid is present, the first boundary condition may be readily modified to account for transient behavior between the injection rate of the treatment fluid and the flow rate at the fracture entrance. In the second boundary condition Eq. 6, $p_0$ is a formation pressure at the fracture front. The second boundary condition provides that the fracture pressure at the fracture tip is equal to the formation pore pressure. The provided example modeling equations and boundary conditions are illustrative and non-limiting.

In certain embodiments, the example procedure further includes an operation to determine a treatment plan corresponding to the fracture treatment description parameter, and an operation to provide the treatment plan. Without limitation, the treatment plan includes any aspect of the treatment, including a treatment injection rate (or treatment injection rate trajectory), a treatment pressure, a size of one or more stages of the treatment, a pad amount and/or pad to proppant laden fluid ratio, and/or a fluid composition including a polymer loading, viscosity, breaker schedule, and/or surfactant concentration.

Without limitation, the operation to provide the treatment plan includes displaying the treatment plan to an output device (e.g. a computer monitor, printer, electronic device, etc.), communicating the treatment plan (e.g. to a device communicatively coupled via a network, datalink, receiver/transmitter, etc.), storing the treatment plan on a computer readable medium accessible at least intermittently to a device (e.g. as a software parameter in a memory location, in a non-volatile memory location, to a distributed memory system, etc.), and/or by communicating the treatment plan (e.g. verbally to a pump operator, providing written instructions, communication by phone, e-mail, or text, etc.). An example treatment plan includes the entire treatment description or any portion thereof.

An example procedure further includes an operation to adjust a treatment plan in response to the fracture treatment description parameter. Additionally or alternatively, the procedure includes performing the operations to adjust the treatment plan during fracturing operations, for example by changing an injection rate for a fracturing stage in real time.

Figure 1:
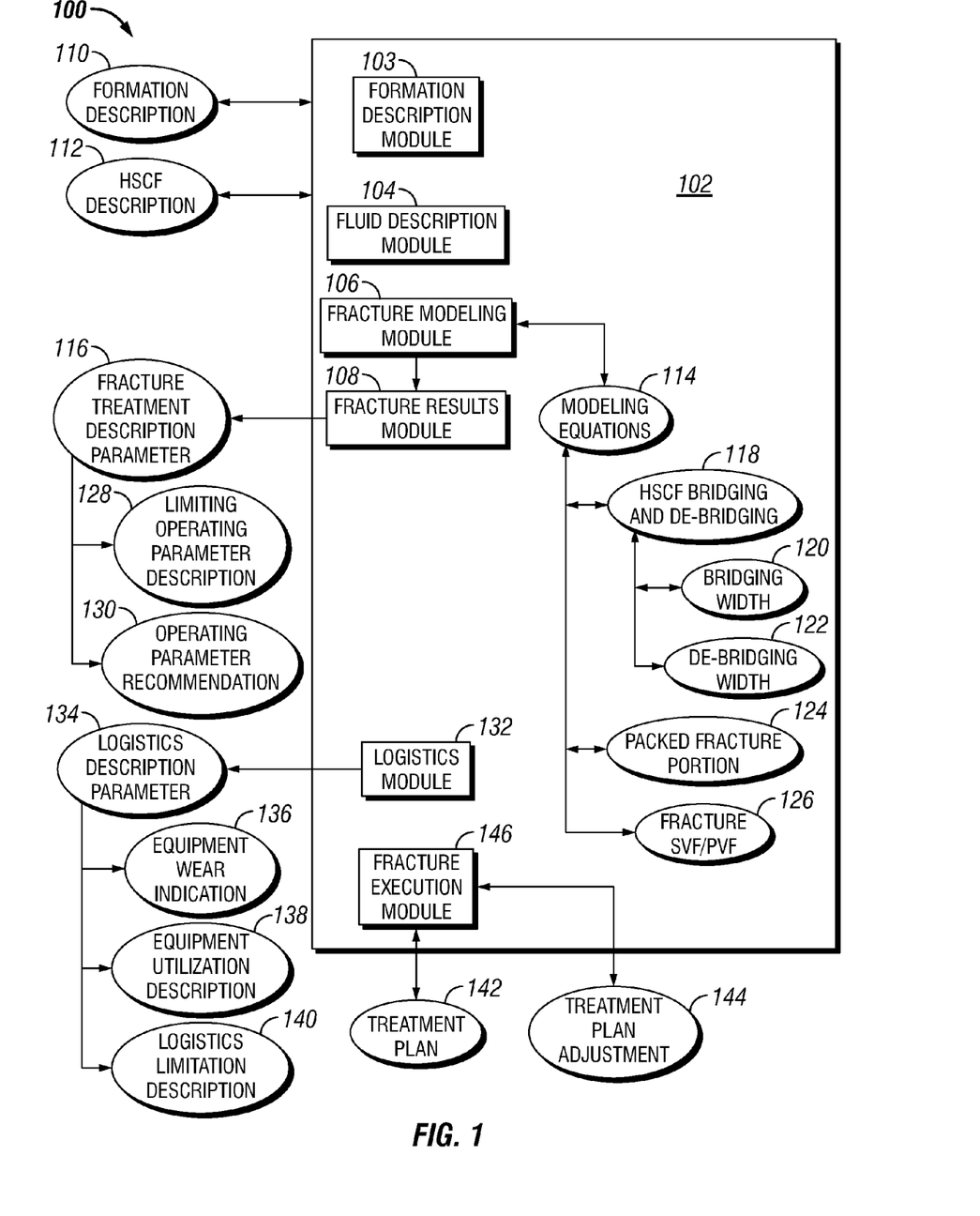
FIG. 1 is a schematic block diagram of an apparatus for modeling a high solids content fluid (HSCF) fracture treatment.
Figure 2A:
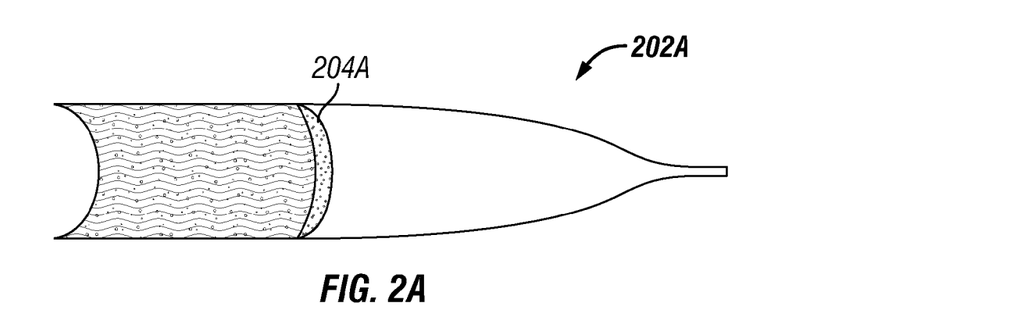
FIGS. 2A-2D are a conceptual illustration of an HSCF bridging and debridging.
Figure 2B:
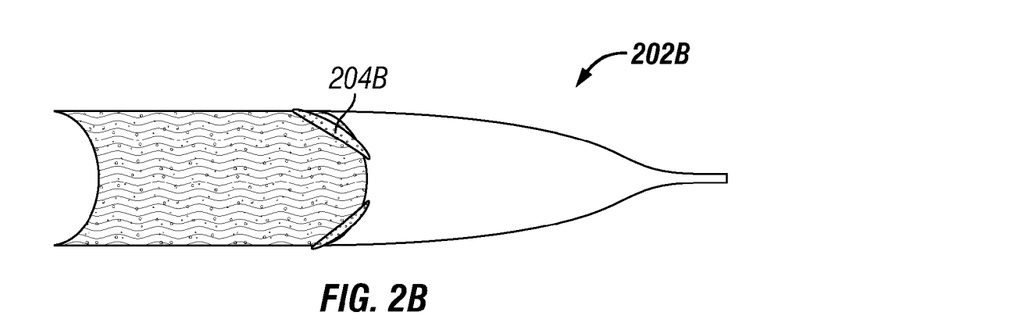
Figure 2C:
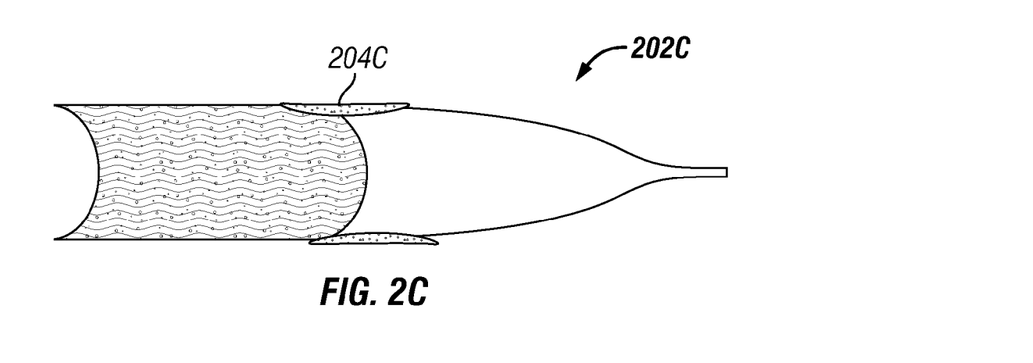
Figure 2D:
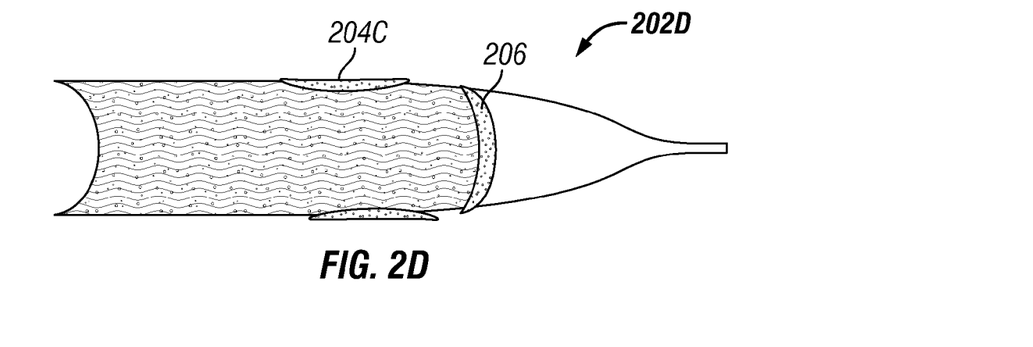

Referencing FIG. 1, an example apparatus 100 includes a controller 102 structured to functionally perform certain operations for modeling a high solids content fluid (HSCF) fracturing treatment. In certain embodiments, the controller 102 forms a portion of a processing subsystem including one or more computing devices having memory, processing, and communication hardware. The controller 102 may be a single device or a distributed device, and the functions of the controller 102 may be performed by hardware or software. The controller 102 is in communication with any sensors, actuators, i/o devices, and/or other devices that allow the controller 102 to perform any described operations.

In certain embodiments, the controller 102 includes one or more modules structured to functionally execute the operations of the controller 102. In certain embodiments, the controller 102 includes a formation description module 103, a fluid description module 104, a fracture modeling module 106, and a fracture results module 108. An example formation description module 103 interprets a formation description 110 corresponding to a formation of interest (not shown). An example fluid description module 104 interprets an HSCF description. An example fracture modeling module 106 models a fracturing operation in the formation of interest in response to the formation description and the HSCF description. An example fracture results module provides a fracture treatment description parameter in response to the model.

In certain embodiments, the controller 102 further includes a logistics module 132 and/or a fracture execution module 146. An example logistics module 132 provides a logistics description parameter in response to the model. An example fracture execution module 146 determines a treatment plan corresponding to the fracture treatment description parameter and provides the treatment plan.

The description herein including modules emphasizes the structural independence of the aspects of the controller 102, and illustrates one grouping of operations and responsibilities of the controller 102. Other groupings that execute similar overall operations are understood within the scope of the present disclosure. Modules may be implemented in hardware and/or software on computer readable medium, and modules may be distributed across various hardware or software components. More specific descriptions of certain embodiments of controller operations are included in the following description.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art including operator entry, and/or by receiving a value by which the interpreted parameter can be calculated, and/or by referencing a default value that is interpreted to be the parameter value.

An example apparatus 100 includes a formation description module 103 that interprets a formation description 110 corresponding to a formation of interest. Example and non-limiting information from the formation description 110 includes a formation fracture gradient and/or fracture initiation pressure, a minimum in-situ stress, a maximum in-situ stress, formation permeability and/or other information that can be correlated to or utilized to determine fluid leakoff, the formation fluid pressure, formation temperature, a Young's modulus of the formation, and/or a Poisson's ratio of the formation. The formation description 110 may be historical information determined from offset wells, information entered by a user, information determined from well logging, from fracture analysis or other tests, and/or best estimates based upon general knowledge about the formation geology, depth, etc. In certain embodiments, portions of the formation description 110 are outputs of the model, and may be determined iteratively, by inference based on other parameters, or by other methods understood in the art.

The example apparatus 100 includes a fluid description module 104 that interprets an HSCF description 112. An HSCF description 112 includes sufficient information about an HSCF fluid to enable the operations of the model. Example and non-limiting information includes a largest particle size, a packed volume fraction (PVF), a solid volume fraction/PVF (SVF/PVF) ratio, a fluid loss characteristic, a power-law fluid parameter, and/or a particle density parameter.

The example apparatus 100 includes a fracture modeling module 106 that models a fracturing operation in the formation of interest in response to the formation description 110 and the HSCF description 112. An example modeling operation includes utilizing modeling equations 114 and modeling HSCF bridging and debridging events 118. In certain embodiments, the fracture modeling module 106 determines a bridging width 120 and a debridging width 122, and determines the HSCF bridging and debridging events 118 in response to the bridging width 120 and a debridging width 122. Alternatively or additionally, the fracture modeling module 106 tracks a packed fracture portion 124 of the modeled fracture, and/or determines an SVF/PVF 126 in the modeled fracture.

The example apparatus 100 includes a fracture results module 108 that provides a fracture treatment description parameter 116 in response to the model. Non-limiting examples of a fracture treatment description parameter include a maximum treating pressure, a maximum and/or a minimum treating injection rate, a treating pressure trajectory, a treating injection rate trajectory, a limiting operating parameter description 128, an operating parameter recommendation 130, a propped fracture length, a propped fracture height, a propped fracture conductivity, an estimated stimulation volume (ESV), and/or a reservoir stimulation volume (RSV). Any parameter provided by the model or derivable from a model output that describes a property of the placed fracture(s) and/or that describes conditions relevant to the placement of the fracture(s) is contemplated as a fracture treatment description parameter 116.

In certain further embodiments, the limiting operating parameter description 128 includes a particle size, a fluid loss characteristic, a carrying fluid viscosity value, a fracture initiation pressure of a second formation hydraulically coupled to the formation of interest, a treatment time value, and/or a treatment fluid stability value. Non-limiting examples are described following. In one example, a particle size is limiting the available fracture length (e.g. due to bridging occurring at a low axial distance along the fracture). An example includes a fluid loss characteristic limiting the available fracture length and/or conductivity and thereby ESV/RSV (e.g. due to early bridging and/or excessive leakoff limiting available pressure generation in the fracture).

Another example includes a carrying fluid viscosity value limiting the available fracture length and/or conductivity (e.g. due to particle settling, excessive leakoff flow rate, excessive fracture height growth, de-fluidization of the HSCF). Another example includes a fracture initiation pressure of another formation hydraulically coupled to the formation of interest (i.e. not hydraulically isolated) limiting a maximum treating pressure of the fracture treatment (e.g. due to a desire to avoid initiating a fracture in the second formation during the fracture treatment). Another example includes a treatment time value limiting the fracture length, conductivity, and/or feasibility of the fracture treatment (e.g. due to leakoff over time, chemical reactions in the fluid and/or particles such as breakers acting before the treatment is complete or breaker inhibition required by lengthy treatment schedules increasing damage in the fracture, thermal breakdown of fracture fluids, etc.). Another example includes a treatment fluid stability value limiting the fracture length, conductivity, and/or feasibility of the fracture treatment (e.g. due to thermal breakdown of the fracture fluids, breakdown of an emulsion or energized fluid, particle settling, chemical reactions in the fluid, breaker action in the fluid, etc.). The described examples of a limiting operating parameter description 128 are illustrative and non-limiting.

In certain embodiments, an operating parameter recommendation 130 includes a particle size adjustment, a fluid loss characteristic adjustment, a treating injection rate value, a formation treatment order adjustment, an HSCF PVF value adjustment, a fluid chemistry adjustment, a particle chemistry adjustment, a friction reduction adjustment, a breaker schedule adjustment, a delayed crosslink adjustment, a bridging promotion adjustment, and/or a particle mix adjustment.

In one example, a fracture width limitation indicates that a longer fracture or a fracture having a greater ESV and/or RSV can be delivered with a smaller largest particle size. In another example, a fracture width indicates that a fracture having a greater ESV and/or RSV can be delivered with a larger largest particle size. In another example, the modeling indicates that an HSCF having a fluid loss characteristic with lower fluid loss will deliver a longer fracture or a fracture having a greater ESV and/or RSV. In another example, the modeling indicates that a carrying fluid viscosity improves the fracture geometry (e.g. through a lower fluid leakoff flow rate for higher viscosity, through reduced fracture height growth for a lower viscosity, etc.) such that a longer fracture or a fracture having a greater ESV and/or RSV can be delivered.

In another example, the modeling indicates that a treating injection rate adjustment improves the placed fracture (e.g. a lower rate avoids a pressure limit or fracture height growth, a higher rate reduces fluid leakoff, extends a bridging distance away from the wellbore, reduces a treatment time, etc.). In another example, a formation treatment order adjustment provides an improved overall fracture placement by changing a treatment order of multiple zones that are to be treated sequentially, including where the multiple zones are in hydraulic communication during the treatments. In another example, an HSCF PVF value adjustment provides a longer fracture or a fracture having a greater ESV and/or RSV (e.g. a higher PVF with a greater percentage of carrier fluid, a changing PVF scheduled over the course of the treatment, etc.). In another example, a fluid chemistry adjustment provides a longer fracture or a fracture having a greater ESV and/or RSV (e.g. a fluid generates viscosity over time to preserve an SVF/PVF ratio and delay bridging, etc.).

In another example, a particle chemistry adjustment provides a longer fracture or a fracture having a greater ESV and/or RSV (e.g. reducing a particle size toward the tip of the fracture, promoting fluid viscosity, reducing leakoff, etc.). In another example, a friction reduction adjustment enables or simplifies a treatment by reducing a treating pressure at a selected portion of the treatment schedule according to the model. In another example, a breaker schedule adjustment provides a longer fracture or a fracture having a greater ESV and/or RSV, for example by delaying or accelerating a fluid viscosity change. In another example, a delayed crosslink adjustment provides a longer fracture or a fracture having a greater ESV and/or RSV, and/or enables or simplifies a treatment (e.g. by generating viscosity at a time or position in the treatment where it is beneficial, and by delaying viscosity generation past a time where it is disadvantageous).

In another example, a bridging promotion adjustment provides a longer fracture or a fracture having a greater ESV and/or RSV, and/or provides for control of a treatment completion time (e.g. by bridging at a selected time and building fracture width in the unpacked fracture portion before the completion of the treatment). In another example, a particle mix adjustment—e.g. to adjust the PVF, settling properties of the HSCF, and/or particle sizes of the HSCF—provides a longer fracture or a fracture having a greater ESV and/or RSV. The described examples of an operating parameter recommendation 130 are illustrative and non-limiting.

In certain embodiments, the apparatus further includes a logistics module 132 that provides a logistics description parameter 134 in response to the model. Certain example and non-limiting logistics description parameters 134 include an equipment wear indication 136, an equipment utilization description 138, and/or a logistics limitation description 140. In certain embodiments, a logistics limitation description 140 includes a pressure rating of a device, a pumping power availability value, a treatment fluid mixing rate value, a treatment fluid availability value, and/or an HSCF solids availability value. The pressure oscillations of a fracture treatment including an HSCF, and the high friction pressures that can be present when pumping an HSCF, can cause unusual pumping power and/or pressure rating requirements. Additionally or alternatively, the pumping power and pressure rating requirements have a high degree of uncertainty when pumping an HSCF, in the absence of a model.

The continuous mixing of an HSCF utilizes a high rate of particulates, which are delivered and mixed with the carrier fluid to produce the HSCF. Where the HSCF is batch mixed in advance, high fluid rates are readily achievable but the HSCF fluid availability is restricted to the batched amount of HSCF. Where the HSCF is mixed in real-time, the fluid availability is more flexible—subject to the available amount of particles at the location—but the mixing equipment can be challenged to provide sufficient particle delivery and blending. Accordingly, the available equipment, available fluids, or both, can be sensitive to modifications in the treatment plan when pumping an HSCF. In certain embodiments, a model reduces the sensitivity of the equipment requirements to complete a fracture treatment in a formation of interest, providing for greater capability to perform an optimal fracture treatment, and/or reduced cost through lower excess equipment, appropriate provisions for treatment fluids and HSCF particles at the location, etc.

In certain embodiments, an equipment utilization description 138 includes a pumping power rating, a pumping injection rate rating, a selection of one or more pumps from a number of available pumps, an HSCF mixing rate capacity value, and/or a blender type value. In certain embodiments, a high rate HSCF treatment where the treatment fluid is mixed in real time during the treatment can challenge or exceed the capacity of a normal blender to receive and mix particles into the HSCF at a sufficient rate. A normal fracturing fluid includes a ratio of fluid to particle intake that differs drastically from an HSCF having a very high PVF. For example, a normal fracturing fluid may have a highest proppant loading of 10 PPA (10 pounds of proppant per gallon of carrier fluid), or about 30% by volume solids depending upon the proppant and fluid densities. An HSCF having a PVF of 0.85 and an SVF/PVF of 0.90 is a fluid having over 75% by volume solids. In certain embodiments, a blender having structural differences to better manage the HSCF is positioned at the location for the HSCF treatment. Accordingly, equipment types, pressure ratings, and the number of units of certain devices available at a location are, in certain embodiments, sensitive to the provided information from the fracture modeling module 106.

In certain embodiments, the equipment wear indication 136 includes an incremental wear indication for treating lines, fracture pumps, valves, or other devices. Available evidence indicates that HSCF wear on devices is not excessive. Nevertheless, in certain embodiments, an HSCF fluid can provide an incremental wear increase, for example at high injection rates. Certain wear parameters such as the treatment injection rate are uncertain, and the output of the fracture modeling module 106 is utilized in certain embodiments to adjust an equipment wear indication 136. Example and non-limiting uses for the equipment wear indication 136 include scheduling a maintenance event, ordering or providing parts to a location, selecting one device over another in response to the equipment wear indication 136, and/or providing an incremental charge for wear to a customer.

In certain embodiments, the apparatus 100 includes a fracture execution module 146 that determines a treatment plan 142 corresponding to the fracture treatment description parameter 116, and provides the treatment plan 142. Without limitation, the treatment plan 142 includes any aspect of the treatment, including a treatment injection rate (or treatment injection rate trajectory), a treatment pressure, a size of one or more stages of the treatment, a pad amount and/or pad to proppant laden fluid ratio, and/or a fluid composition including a polymer loading, viscosity, breaker schedule, and/or surfactant concentration.

Without limitation, the fracture execution module 146 provides the treatment plan by displaying the treatment plan to an output device (e.g. a computer monitor, printer, electronic device, etc.), communicating the treatment plan (e.g. to a device communicatively coupled via a network, datalink, receiver/transmitter, etc.), storing the treatment plan on a computer readable medium accessible at least intermittently to a device (e.g. as a software parameter in a memory location, in a non-volatile memory location, to a distributed memory system, etc.), and/or by communicating the treatment plan (e.g. verbally to a pump operator, providing written instructions, communication by phone, e-mail, or text, etc.). An example treatment plan 142 includes the entire treatment description or any portion thereof.

An example fracture execution module 146 further provides a treatment plan adjustment 144 in response to the fracture treatment description parameter 116. Additionally or alternatively, the fracture execution module 146 includes providing the treatment plan adjustment 144 during fracturing operations, for example by changing an injection rate for a fracturing stage in real time. Any treatment plan adjustment 144, including changing any aspect of the treatment plan 142, is contemplated herein.

As is evident from the figures and text presented above, a variety of embodiments according to the present disclosure are contemplated.

An example set of embodiments is a method including interpreting a formation description corresponding to a formation of interest, interpreting a high solids content fluid (HSCF) description, modeling a fracturing operation in the formation of interest in response to the formation description and the HSCF description, and in response to the modeling, providing a fracture treatment description parameter. In certain further embodiments, the method includes modeling by modeling HSCF bridging and debridging events, and determining pressure oscillations in response to the HSCF bridging and debridging events. In certain further embodiments, the modeling HSCF bridging and debridging events includes estimating a first fracture width to cause bridging in the HSCF and a second fracture width to cause debridging in the HSCF, wherein the second fracture width is greater than the first fracture width. Example fracture width values include the first fracture width estimated at a width less than 2.5 times a largest particle size of the HSCF, and the second fracture width estimated at a width greater than 5.5 times the largest particle size of the HSCF.

Additionally or alternatively, the modeling HSCF bridging and debridging events includes tracking a packed fracture portion, a fluid loss through the packed fracture portion, and a fracture width at the packed fracture portion. In certain further embodiments, the tracking the packed fracture portion includes modeling a fluid loss of the HSCF in the fracture, and determining a solid volume fraction/packed volume fraction (SVF/PVF) value for the HSCF in the fracture, and tracking the packed fracture portion in response to the SVF/PVF value.

In certain embodiments, the modeling includes a width profile equation such as $$w(x) = \frac{4}{\pi E'} \int_0^L \ln\left[\frac{\sqrt{L^2 - x^2} + \sqrt{L^2 - \xi^2}}{\sqrt{L^2 - x^2} - \sqrt{L^2 - \xi^2}}\right][p(\xi) - \sigma_{min}]\,d\xi,$$

a fluid flow equation such as $$\frac{\partial w}{\partial t} + \frac{\partial q}{\partial x} + q_L = 0,$$

a fluid leakoff equation such as $$q_L = \frac{2C_L}{\sqrt{t - \tau(x)}},$$

and a flow rate equation such as $$q = -\frac{n}{n+1}\left(\frac{1}{2^{n+1}k}\right)^{\frac{1}{n}}\left(\frac{\partial p}{\partial x}\right)^{\frac{1}{n}} w^{\frac{2n+1}{n}}.$$

An example model includes a first boundary condition such as $q(0,t)=q_i(t)$, and a second boundary condition such as $p(L,t)=p_0$ at $x=L$. In the example equations, $w(x)$ is the fracture width at axial position $x$, $E'$ is the plane strain Young's modulus $$E' = \frac{E}{1 - v^2},$$

where $E$ is the Young's modulus of the formation of interest and $v$ is the Poisson's ratio of the formation of interest, $L$ is the axial extent of the fracture, where $\sigma_{min}$ is the minimum in-situ horizontal stress, where $\xi$ is a distance related integration variable from 0 (e.g. at the wellbore) to $L$, where $C_L$ is a fluid leakoff coefficient, where $t$ is injection time, where $\tau$ is a leakoff time at a position $x$, where $n$ and $k$ are power-law fluid parameters, and where $p_0$ is a formation pressure at the fracture front. An example method includes the HSCF description having a largest particle size, a PVF, a solid volume fraction/PVF (SVF/PVF) ratio, a fluid loss characteristic, at least one power-law fluid parameter, and/or at least one particle density parameter.

Yet another example set of embodiments is an apparatus including a formation description module that interprets a formation description corresponding to a formation of interest, a fluid description module that interprets a high solids content fluid (HSCF) description, a fracture modeling module that models a fracturing operation in the formation of interest in response to the formation description and the HSCF description, and a fracture results module that provides a fracture treatment description parameter in response to the model.

Non-limiting examples of a fracture treatment description parameter include a maximum treating pressure, a maximum and/or a minimum treating injection rate, a treating pressure trajectory, a treating injection rate trajectory, a limiting operating parameter description, an operating parameter recommendation, a propped fracture length, a propped fracture height, a propped fracture conductivity, an estimated stimulation volume (ESV), and/or a reservoir stimulation volume (RSV). Any parameter provided by the model or derivable from a model output that describes a property of the placed fracture(s) and/or that describes conditions relevant to the placement of the fracture(s) is contemplated as a fracture treatment description parameter.

In certain further embodiments, the limiting operating parameter description includes a particle size, a fluid loss characteristic, a carrying fluid viscosity value, a fracture initiation pressure of a second formation hydraulically coupled to the formation of interest, a treatment time value, and/or a treatment fluid stability value. Additionally or alternatively, an operating parameter recommendation includes a particle size adjustment, a fluid loss characteristic adjustment, a treating injection rate value, a formation treatment order adjustment, an HSCF PVF value adjustment, a fluid chemistry adjustment, a particle chemistry adjustment, a friction reduction adjustment, a breaker schedule adjustment, a delayed crosslink adjustment, a bridging promotion adjustment, and/or a particle mix adjustment.

In certain embodiments, the apparatus further includes a logistics module that provides a logistics description parameter in response to the model. Certain example and non-limiting logistics description parameters include an equipment wear indication, an equipment utilization description, and/or a logistics limitation description. In certain embodiments, a logistics limitation description includes a pressure rating of a device, a pumping power availability value, a treatment fluid mixing rate value, a treatment fluid availability value, and/or an HSCF solids availability value. Additionally or alternatively, an equipment utilization description includes a pumping power rating, a pumping injection rate rating, a selection of one or more pumps from a number of available pumps, an HSCF mixing rate capacity value, and/or a blender type value.

Yet another set of embodiments is a method including interpreting a formation description corresponding to a formation of interest, interpreting a high solids content fluid (HSCF) description, and modeling a fracturing operation in the formation of interest in response to the formation description and the HSCF description. The modeling includes modeling HSCF bridging and debridging events, and determining pressure oscillations in response to the HSCF bridging and debridging events. In the example method, modeling HSCF bridging and debridging events includes estimating a first fracture width to cause bridging in the HSCF and a second fracture width to cause debridging in the HSCF, where the second fracture width is greater than the first fracture width. The method further includes, in response to the modeling, providing a fracture treatment description parameter.

In certain embodiments, the method includes determining a treatment plan corresponding to the fracture treatment description parameter, and providing the treatment plan. The example method includes adjusting a treatment plan in response to the fracture treatment description parameter. Additionally or alternatively, the operations to adjust the treatment plan are performed during fracturing operations.

While the disclosure has provided specific and detailed descriptions to various embodiments, the same is to be considered as illustrative and not restrictive in character. Only certain example embodiments have been shown and described. Those skilled in the art will appreciate that many modifications are possible in the example embodiments without materially departing from the disclosure. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. In the claims, means-plus-function clauses are intended to cover the structures described herein as performing the recited function and not only structural equivalents, but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method comprising:
using a processor to perform the following:
interpreting a formation description corresponding to a formation of interest;
interpreting a high solids content fluid (HSCF) description;
modeling a fracturing operation comprising HSCF bridging and debridging events, in the formation of interest, and determining pressure oscillations in response to the formation description and the HSCF bridging and debridging events; and
in response to the modeling, providing a fracture treatment description parameter
wherein the modeling HSCF bridging and debridging events comprises estimating a first fracture width at a width less than 2.5 times a largest particle size of the HSCF and a second fracture width estimated at a width greater than 5.5 times the largest particle size of the HSCF,
wherein the modeling comprises a width profile equation $$w(x) = \frac{4}{\pi E'} \int_0^L \ln\left[\frac{\sqrt{L^2-x^2} + \sqrt{L^2-\xi^2}}{\sqrt{L^2-x^2} - \sqrt{L^2-\xi^2}}\right] [p(\xi) - \sigma_{min}] \, d\xi,$$

a fluid flow equation $$\frac{\partial w}{\partial t} + \frac{\partial q}{\partial x} + q_L = 0,$$

a fluid leakoff equation $$q_L = \frac{2C_L}{\sqrt{t - \tau(x)}},$$

a flow rate equation $$q = -\frac{n}{n+1}\left(\frac{1}{2^{n+1}k}\right)^{\frac{1}{n}}\left(\frac{\partial p}{\partial x}\right)^{\frac{1}{n}} w^{\frac{2n+1}{n}},$$

a first boundary condition comprising $q(0,t)=q_i(t)$, and a second boundary condition comprising $p(L,t)=p_0$ at $x=L$; wherein $w(x)$ is the fracture width at axial position x, E' is a plane strain Young's modulus $$E' = \frac{E}{1-v^2},$$

wherein E is a Young's modulus and v is a Poisson's ratio, wherein L is an axial extent of the fracture, wherein $\sigma_{min}$ is a minimum in-situ horizontal stress, wherein $\xi$ is a distance related integration variable, wherein $C_L$ is a fluid leakoff coefficient, wherein t is injection time, wherein $\tau$ is a leakoff time at a position x, wherein n and k are power-law fluid parameters, and wherein $p_0$ is a formation pressure at the fracture front.

2. The method of claim 1, wherein the modeling HSCF bridging and debridging events comprises tracking a packed fracture portion, a fluid loss through the packed fracture portion, and a fracture width at the packed fracture portion.

3. The method of claim 2, wherein the tracking the packed fracture portion comprises modeling a fluid loss of the HSCF in the fracture, determining a solid volume fraction/packed volume fraction (SVF/PVF) value for the HSCF in the fracture, and tracking the packed fracture portion in response to the SVF/PVF value.

4. The method of claim 1, wherein the HSCF description includes at least one parameter selected from the parameters consisting of a largest particle size, a packed volume fraction (PVF), a solid volume fraction/PVF (SVF/PVF) ratio, a fluid loss characteristic, at least one power-law fluid parameter, and at least one particle density parameter.

5. A method comprising:
using a processor to perform the following:
interpreting a formation description corresponding to a formation of interest;
interpreting a high solids content fluid (HSCF) description;
modeling a fracturing operation in the formation of interest in response to the formation description and the HSCF description, wherein the modeling comprises modeling HSCF bridging and debridging events, and determining pressure oscillations in response to the HSCF bridging and debridging events, and wherein the modeling HSCF bridging and debridging events comprises estimating a first fracture width at a width less than 2.5 times a largest particle size of the HSCF and a second fracture width estimated at a width greater than 5.5 times the largest particle size of the HSCF; and
in response to the modeling, providing a fracture treatment description parameter
wherein the modeling comprises a width profile equation $$w(x) = \frac{4}{\pi E'} \int_0^L \ln\left[\frac{\sqrt{L^2 - x^2} + \sqrt{L^2 - \xi^2}}{\sqrt{L^2 - x^2} - \sqrt{L^2 - \xi^2}}\right] [p(\xi) - \sigma_{min}] d\xi,$$

a fluid flow equation $$\frac{\partial w}{\partial t} + \frac{\partial q}{\partial x} + q_L = 0,$$

a fluid leakoff equation $$q_L = \frac{2C_L}{\sqrt{t - \tau(x)}},$$

a flow rate equation $$q = -\frac{n}{n+1}\left(\frac{1}{2^{n+1}k}\right)^{\frac{1}{n}}\left(\frac{\partial p}{\partial x}\right)^{\frac{1}{n}} w^{\frac{2n+1}{n}},$$

a first boundary condition comprising $q(0,t)=q_i(t)$, and a second boundary condition comprising $p(L,t)=p_0$ at x=L; wherein w(x) is the fracture width at axial position x, E' is a plane strain Young's modulus $$E' = \frac{E}{1-v^2},$$

wherein E is a Young's modulus and v is a Poisson's ratio, wherein L is an axial extent of the fracture, wherein $\sigma_{min}$ is a minimum in-situ horizontal stress, wherein $\xi$ is a distance related integration variable, wherein $C_L$ is a fluid leakoff coefficient, wherein t is injection time, wherein $\tau$ is a leakoff time at a position x, wherein n and k are power-law fluid parameters, and wherein $p_0$ is a formation pressure at the fracture front.

6. The method of claim 5, further comprising determining a treatment plan corresponding to the fracture treatment description parameter, and providing the treatment plan.

7. The method of claim 5, further comprising adjusting a treatment plan in response to the fracture treatment description parameter.

8. The method of claim 7, wherein the adjusting the treatment plan is performed during fracturing operations.

* * * * *